(12) United States Patent
Mizusawa

(10) Patent No.: US 9,359,026 B2
(45) Date of Patent: Jun. 7, 2016

(54) RUBBER CRAWLER

(71) Applicant: BRIDGESTONE CORPORATION, Chuo-ku, Tokyo (JP)

(72) Inventor: Takashi Mizusawa, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/403,271

(22) PCT Filed: May 16, 2013

(86) PCT No.: PCT/JP2013/063681
§ 371 (c)(1),
(2) Date: Nov. 24, 2014

(87) PCT Pub. No.: WO2013/176034
PCT Pub. Date: Nov. 28, 2013

(65) Prior Publication Data
US 2015/0091372 A1 Apr. 2, 2015

(30) Foreign Application Priority Data
May 25, 2012 (JP) ................................. 2012-119777

(51) Int. Cl.
*B62D 55/24* (2006.01)

(52) U.S. Cl.
CPC ............ *B62D 55/244* (2013.01); *B62D 55/242* (2013.01)

(58) Field of Classification Search
CPC ..... B62D 55/244; B62D 55/253; B62D 55/24
USPC .......................................... 305/170, 167, 166
See application file for complete search history.

(56) References Cited

U.S. PATENT DOCUMENTS 5,211,609 A * 5/1993 Haines ...................... F16G 1/08
474/260
6,272,830 B1 * 8/2001 Morgan ............... D07B 1/0613
152/451

(Continued)

FOREIGN PATENT DOCUMENTS

JP         08-320051 A      12/1996
WO      2010/021384 A1      2/2010

OTHER PUBLICATIONS

International Search Report of PCT/JP2013/063681 dated Aug. 20, 2013.

(Continued)

*Primary Examiner* — Hau Phan
(74) *Attorney, Agent, or Firm* — Sughrue Mion, PLLC

(57) ABSTRACT

A rubber crawler includes a rubber belt, a main cord layer that is incorporated within the rubber belt and includes a main cord configured from plural twisted strands covered with rubber, the main cord extending around the crawler circumferential direction, and a bias cord layer incorporated within the rubber belt at the crawler circumferential outside of the main cord layer configured by at least one bias ply and configured from at least one bias ply that is formed from a plurality of bias cords extending at an angle with respect to the crawler circumferential direction, disposed side-by-side around the crawler circumferential direction and covered in rubber such that bias cords of the bias ply at the circumferential outermost side of the crawler are, as viewed from the crawler circumferential outside, angled toward an opposite side, with respect to the crawler circumferential direction, from the angled side of the strands.

2 Claims, 10 Drawing Sheets

(56) References Cited

U.S. PATENT DOCUMENTS

| | | | | |
|---|---|---|---|---|
| 7,083,242 B2* | 8/2006 | Piou | ................ | B62D 55/244 305/166 |
| 7,823,988 B2* | 11/2010 | Song | ................ | B62D 55/244 305/167 |
| 8,157,685 B2* | 4/2012 | Muma | ................ | A01F 15/18 474/260 |
| 8,191,976 B2* | 6/2012 | Sugihara | ............ | B62D 55/253 305/167 |
| 2002/0067074 A1* | 6/2002 | Katayama | ............ | B62D 55/244 305/170 |
| 2002/0195877 A1* | 12/2002 | Tsuru | ................ | B62D 55/244 305/170 |
| 2004/0019515 A1* | 1/2004 | Senyurt | ............ | G06Q 10/06311 705/7.13 |
| 2004/0029669 A1* | 2/2004 | Phely | ................ | B62D 55/244 474/202 |
| 2004/0235600 A1 | 11/2004 | Piou et al. | | |
| 2006/0232129 A1* | 10/2006 | Fujita | ................ | B62D 55/244 305/170 |
| 2009/0079260 A1 | 3/2009 | Song | | |
| 2011/0169324 A1 | 7/2011 | Ijiri | | |

OTHER PUBLICATIONS

Communication dated Dec. 16, 2015 from the European Patent Office in counterpart application No. 13793868.4.

* cited by examiner

RUBBER CRAWLER

CROSS REFERENCE TO RELATED APPLICATIONS

This is a National Stage of International Application No. PCT/JP2013/063681 filed May 16, 2013, claiming priority based on Japanese Patent Application No. 2012-119777 filed May 25, 2012, the contents of all of which are incorporated herein by reference in their entirety.

TECHNICAL FIELD

The present invention relates to a rubber crawler.

BACKGROUND ART

Generally steel cord layers acting as tensile bodies are internally incorporated in rubber crawlers. From the perspective of durability, such steel cord layers normally have a structure of a single rubber covered steel cord wound in a spiral shape.

However, in spiral structure steel cord layers, the steel cord extends at an angle with respect to the crawler circumferential direction, such that shear deformation occurs in response to tension in the crawler circumferential direction due to anisotropic elasticity of the steel cord layer.

The rubber crawler, trained around the wheels of a machine body under a specific tension, is affected by the shear deformation of the steel cord layer and deforms, resulting in slippage in the crawler width direction (referred to below as "lateral slippage" where appropriate) as the crawler revolves (circulates) between the wheels on which it is trained.

Frequently encountered measures for suppressing lateral slippage of the rubber crawler include adjusting the attachment of the wheels (wheel alignment), providing the rubber crawler with guide projections that guide the rotation direction of the wheels, providing a bias cord layer that undergoes shear deformation in a direction to cancel out the shear deformation of the steel cord layer, and the like.

A rubber crawler described in Japanese Patent Application Laid-Open (JP-A) No. H08-320051 suppresses lateral slippage during travel by configuring the angle with respect to the crawler circumferential direction of steel cord in a steel cord layer in left-right reversed directions on either side of a crawler center line.

SUMMARY OF INVENTION

Technical Problem

From the perspectives of tensile strength and flexibility with respect to bending, steel cord normally has a structure of plural twisted together strands.

However, recent testing has shown that the twisting direction of these strands affects lateral slippage of the rubber crawler as well as the angle of the steel cord with respect to the crawler circumferential direction. In particular, the stronger and larger in diameter the strands, the greater the influence of the strand twisting direction on lateral slippage of the rubber crawler, sometimes outweighing the influence of the angle of the steel cord with respect to the crawler circumferential direction.

An object of the present invention is to suppress deformation of each internally incorporated cord layer, and to suppress lateral slippage of a rubber crawler during travel.

Solution to Problem

A rubber crawler of a first aspect of the present invention includes: an endless rubber body that is trained around plural wheels; a main cord layer that is incorporated within the rubber body and includes a main cord configured from plural twisted strands covered with rubber, the main cord extending around a rubber body circumferential direction; and a bias cord layer that is incorporated within the rubber body further to a rubber body circumferential outside than the main cord layer and configured from at least one bias ply that is formed from plural bias cords extending at an angle with respect to the rubber body circumferential direction, disposed side-by-side around the rubber body circumferential direction and covered in rubber such that bias cords of the bias ply at a circumferential outermost side of the rubber body are, as viewed from the rubber body circumferential outside, angled toward an opposite side, with respect to the rubber body circumferential direction, from the angled side of the strands.

Advantageous Effects of Invention

As described above, the rubber crawler of the present invention is capable of suppressing deformation of respective internally incorporated cord layers, and of suppressing lateral slippage during travel.

DESCRIPTION OF EMBODIMENTS

Explanation follows regarding a rubber crawler according to a first exemplary embodiment of the present invention, with reference to FIG. 1 to FIG. 5.

An endless rubber crawler 10 according to the first exemplary embodiment is what is referred to as a metal-core-less type rubber crawler that does not have a metal core.

Figure 1:
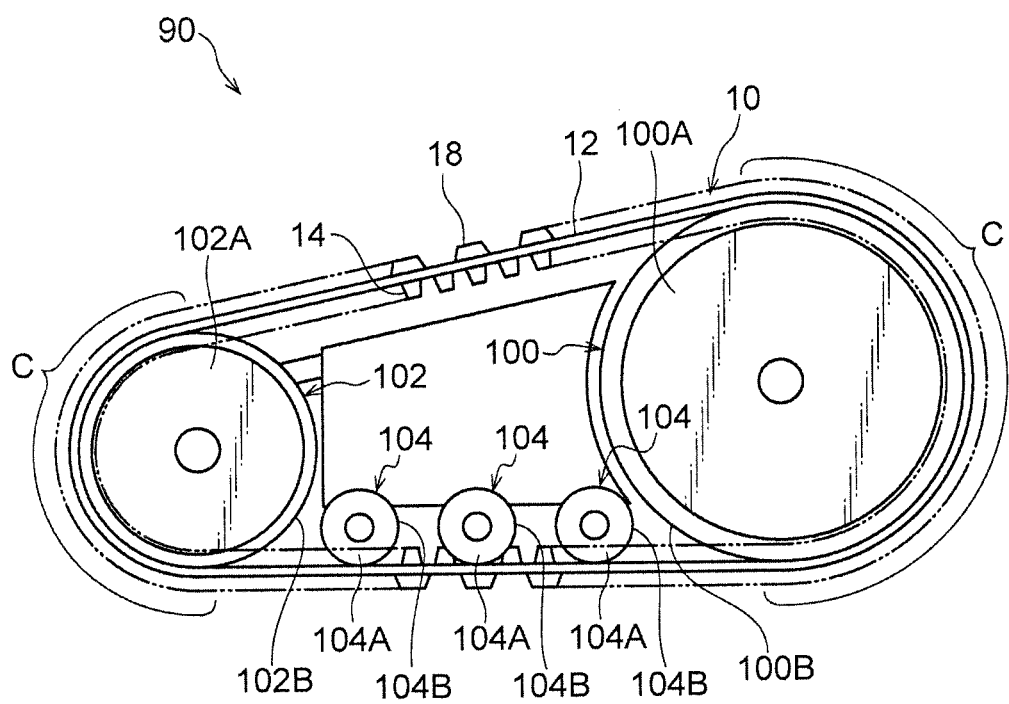
FIG. 1 is a side view of a rubber crawler of a first exemplary embodiment, as viewed along the crawler width direction.

As illustrated in FIG. 1, the rubber crawler 10 is employed trained around a drive wheel 100 coupled to a drive shaft of a tracked vehicle, serving as a machine body, and an idler wheel 102 rotatably attached to the tracked vehicle. At the inner periphery of the rubber crawler 10, plural rollers 104 are disposed between the drive wheel 100 and the idler wheel 102 and rotatably attached to the tracked vehicle so as to rotate. The drive wheel 100, the idler wheel 102, and the rollers 104 are each examples of wheels of the present invention.

In the present exemplary embodiment, the circumferential direction of the endless rubber crawler 10 (the arrow S direction in FIG. 3) is referred to as the "crawler circumferential direction", and the width direction of the rubber crawler 10 (the arrow W direction in FIG. 3) is referred to as the "crawler width direction". The crawler circumferential direction and the crawler width direction are orthogonal to one another as viewed from the circumferential outside or the circumferential inside of the rubber crawler 10.

In the present exemplary embodiment, the circumferential inside (the arrow IN direction side in FIG. 3) of the rubber crawler 10 trained in a ring shape (encompassing circular ring shapes, elliptical ring shapes, and polygonal ring shapes) around the drive wheel 100 and the idler wheel 102 is referred to as the "crawler circumferential inside", and the circumferential outside of the rubber crawler 10 (the arrow OUT direction side in FIG. 3) is referred to as the "crawler circumferential outside". The arrow IN direction (ring shape inside direction) and the arrow OUT direction (ring shape outside direction) in FIG. 3 indicate the inward and outward directions of the rubber crawler 10 in a trained state.

In the present exemplary embodiment, the rubber crawler 10 is configured trained around the drive wheel 100 and the idler wheel 102; however the present invention is not limited thereto, and depending on the placement of the drive wheel 100, the idler wheel 102, and the rollers 104, the rubber crawler 10 may be configured trained around one or more of the rollers 104 in addition to the drive wheel 100 and the idler wheel 102.

The drive wheel 100, the idler wheel 102, the rollers 104, and the rubber crawler 10 trained thereon configure a crawler traveling device 90 (see FIG. 1) of the first exemplary embodiment, serving as a traveling section of the tracked vehicle.

As illustrated in FIG. 1, the drive wheel 100 includes a pair of circular plate shaped wheel portions 100A coupled to the drive shaft of the tracked vehicle. Outer circumferential faces 100B of the wheel portions 100A contact and rotate wheel-rotated faces 16 of the rubber crawler 10, described later. The drive wheel 100 imparts drive force of the tracked vehicle to the rubber crawler 10 (detailed explanation of which follows later), circulating the rubber crawler 10 between the drive wheel 100 and the idler wheel 102.

The idler wheel 102 includes a pair of circular plate shaped wheel portions 102A rotatably attached to the tracked vehicle. Outer circumferential faces 102B of the wheel portions 102A contact the wheel-rotated faces 16 of the rubber crawler 10, described later. A pressing mechanism, for example a hydraulic pressing mechanism, not illustrated in the drawings, is provided on the tracked vehicle side to push the idler wheel 102 in a direction away from the drive wheel 100, and press the idler wheel 102 against the wheel-rotated faces 16 of the rubber crawler 10 so as to maintain tension (tensile force) in the rubber crawler 10.

The rollers 104 support the weight of the tracked vehicle, and include circular plate shaped wheel portions 104A rotatably attached to the tracked vehicle. Outer circumferential faces 104B of the wheel portions 104A contact the wheel-rotated faces 16 of the rubber crawler 10, described later.

The idler wheel 102 and the rollers 104 rotate to follow the rubber crawler 10 circulating between the drive wheel 100 and the idler wheel 102.

Figure 2:
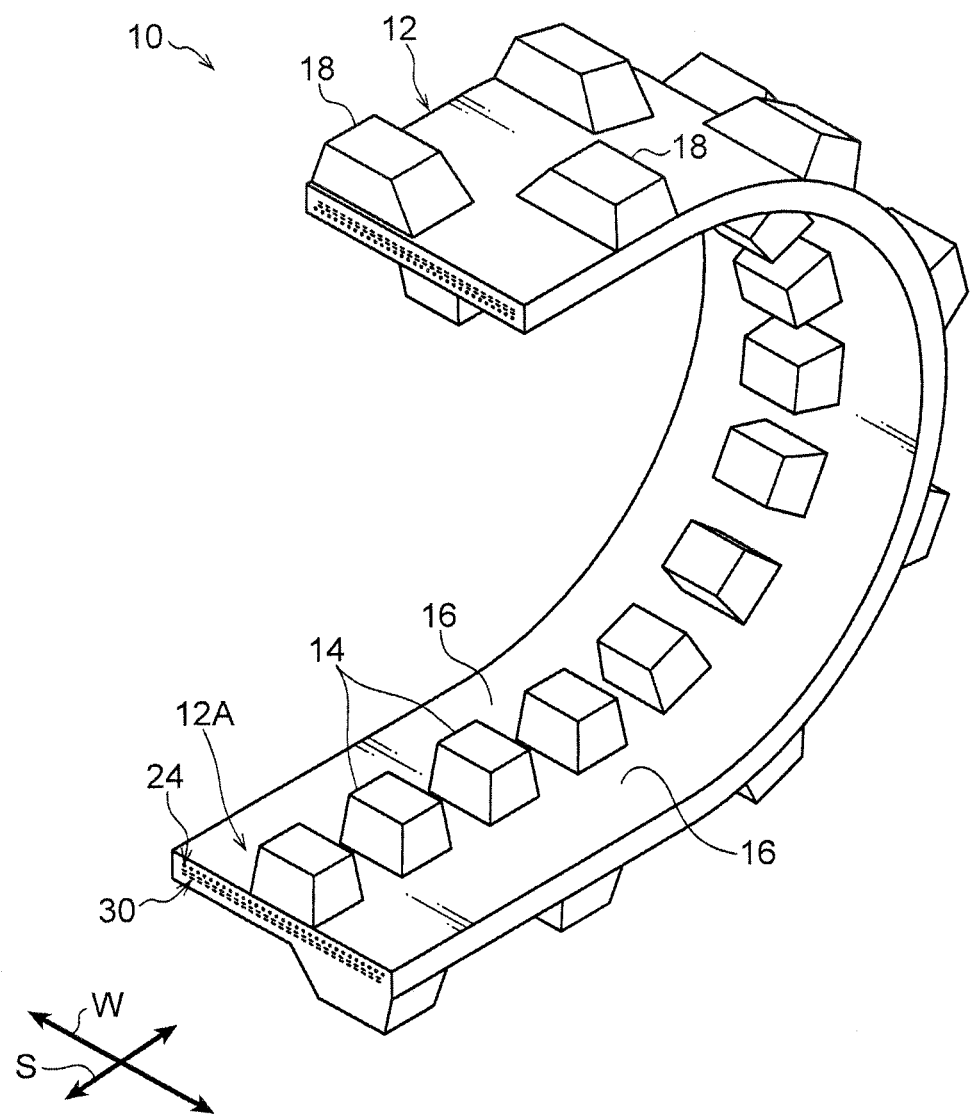
FIG. 2 is a perspective view, including a partial cross-section, of a rubber crawler of the first exemplary embodiment.

As illustrated in FIG. 1 and FIG. 2, the rubber crawler 10 includes a rubber belt 12, formed from rubber in an endless belt shape. The rubber belt 12 of the present exemplary embodiment is an example of an endless rubber body of the present invention. The circumferential direction (rubber body circumferential direction), width direction (rubber body width direction), circumferential inside (rubber body circumferential inside), and circumferential outside (rubber body circumferential outside) of the rubber belt 12 of the present exemplary embodiment respectively correspond to the crawler circumferential direction, the crawler width direction, the crawler circumferential inside, and the crawler circumferential outside.

As illustrated in FIG. 1 and FIG. 2, an inner circumferential face 12A of the rubber belt 12 is formed with plural rubber projections 14 that project out toward the crawler circumferential inside at intervals around the crawler circumferential direction. The rubber projections 14 are disposed at a crawler width direction central portion of the rubber belt 12, and limit movement of the wheels in the crawler width direction by contacting the wheels rotating at the wheel-rotated faces 16, described later. In other words, the rubber projections 14 contact the wheels, thereby suppressing relative displacement between the rubber crawler 10 and the wheels in the crawler width direction, namely suppressing lateral slippage of the rubber crawler 10 with respect to the wheels.

Figure 3:
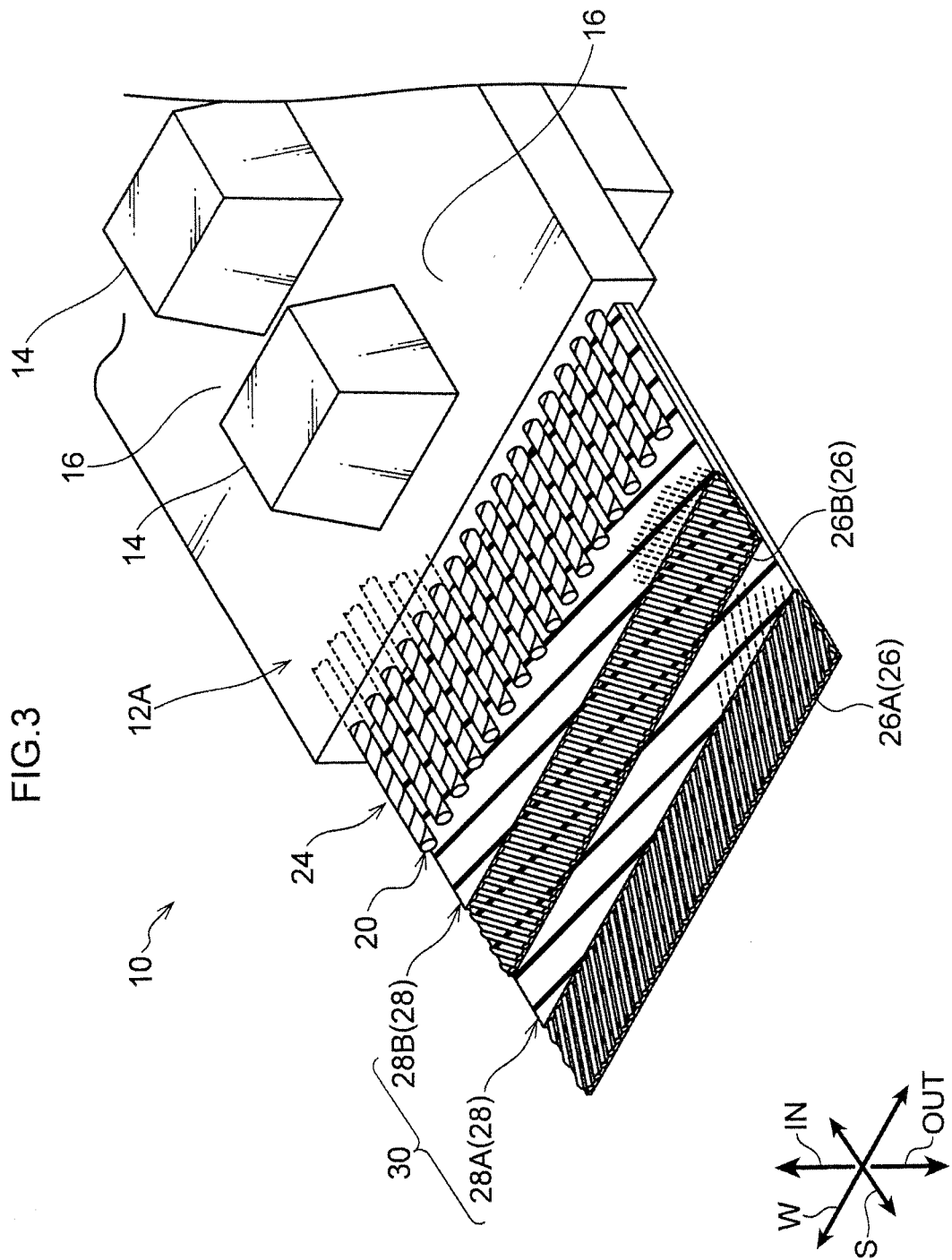
FIG. 3 is a perspective view, including a partial cross-section, of respective cord layers of a rubber crawler of the first exemplary embodiment.
Figure 4:
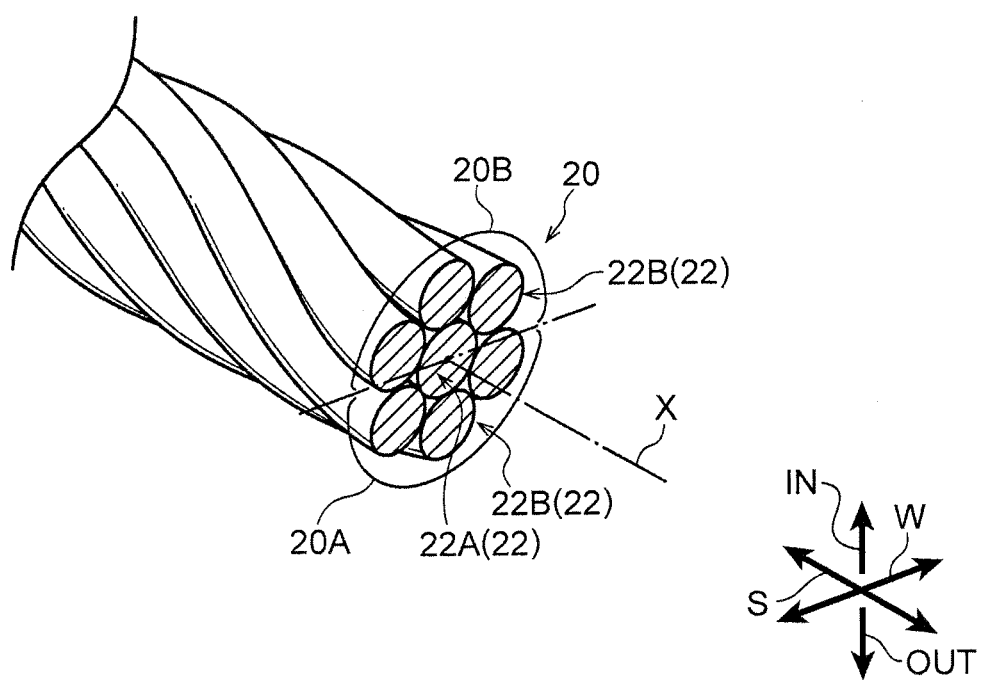
FIG. 4 is a perspective view illustrating main cord employed in a rubber crawler of the first exemplary embodiment.

As illustrated in FIG. 2 and FIG. 3, the wheel-rotated faces 16 are respectively formed extending around the crawler circumferential direction of the rubber belt 12 on both crawler width direction sides of the rubber projections 14. The wheel-rotated faces 16 are each configured with a flat profile, and configure a portion of the inner circumferential face 12A of the rubber belt 12. Note that in the present exemplary embodiment, faces on the inner circumferential face 12A of the rubber belt 12 between the rubber projections 14 are configured in the same plane (namely at the same height) as the wheel-rotated faces 16, however the present invention is not limited thereto, and the wheel-rotated faces 16 may be raised further toward the crawler circumferential inside than the faces between the rubber projections.

In the present exemplary embodiment, the drive wheel 100, the idler wheel 102, and the rollers 104 rotate at the wheel-rotated faces 16 as described above.

Due to the rubber crawler 10 (rubber belt 12) being trained around the drive wheel 100 and the idler wheel 102 under a specific tensile force, frictional force arises between the outer circumferential faces 100B of the drive wheel 100 and the wheel-rotated faces 16, transmitting drive force of the drive wheel 100 to the rubber crawler 10, and circulating the rubber crawler 10 between the drive wheel 100 and the idler wheel 102 such that the rubber crawler 10 travels.

As illustrated in FIG. 1 and FIG. 2, the outer periphery of the rubber belt 12 is formed with block shaped lugs 18 that project out toward the crawler circumferential outside and make contact with the ground. The lugs 18 are disposed in left-right pairs on either side of a center line CL, with plural of the lugs 18 formed at intervals around the crawler circumferential direction. The shape of the lugs 18 is not limited to that illustrated in FIG. 2, and may be any shape capable of gripping the ground when the rubber crawler 10 is traveling.

As illustrated in FIG. 3, an endless main cord layer 24, formed by a main cord 20 configured from plural twisted strands 22 (see FIG. 4) covered with rubber, and extending around the crawler circumferential direction, is incorporated within the rubber belt 12. The rubber covering the main cord 20 is omitted from illustration in FIG. 3 and FIG. 4, and in FIG. 5, the rubber covering the main cord 20 is illustrated by a double-dotted intermittent line. Although omitted from illustration in the drawings, each of the strands 22 is configured by twisting together plural filaments.

To elaborate more specifically on the main cord layer 24, the main cord layer 24 is formed by winding a single rubber covered main cord 20 around the crawler circumferential direction plural times in a spiral shape. The main cord 20 is configured by Z-twisting the strands 22. In the present exemplary embodiment, the main cord 20 is configured with a 1+6 twist structure (a structure of 6 sheath strands 22B wrapped (wound) around the periphery of a single core strand 22A).

Figure 5:
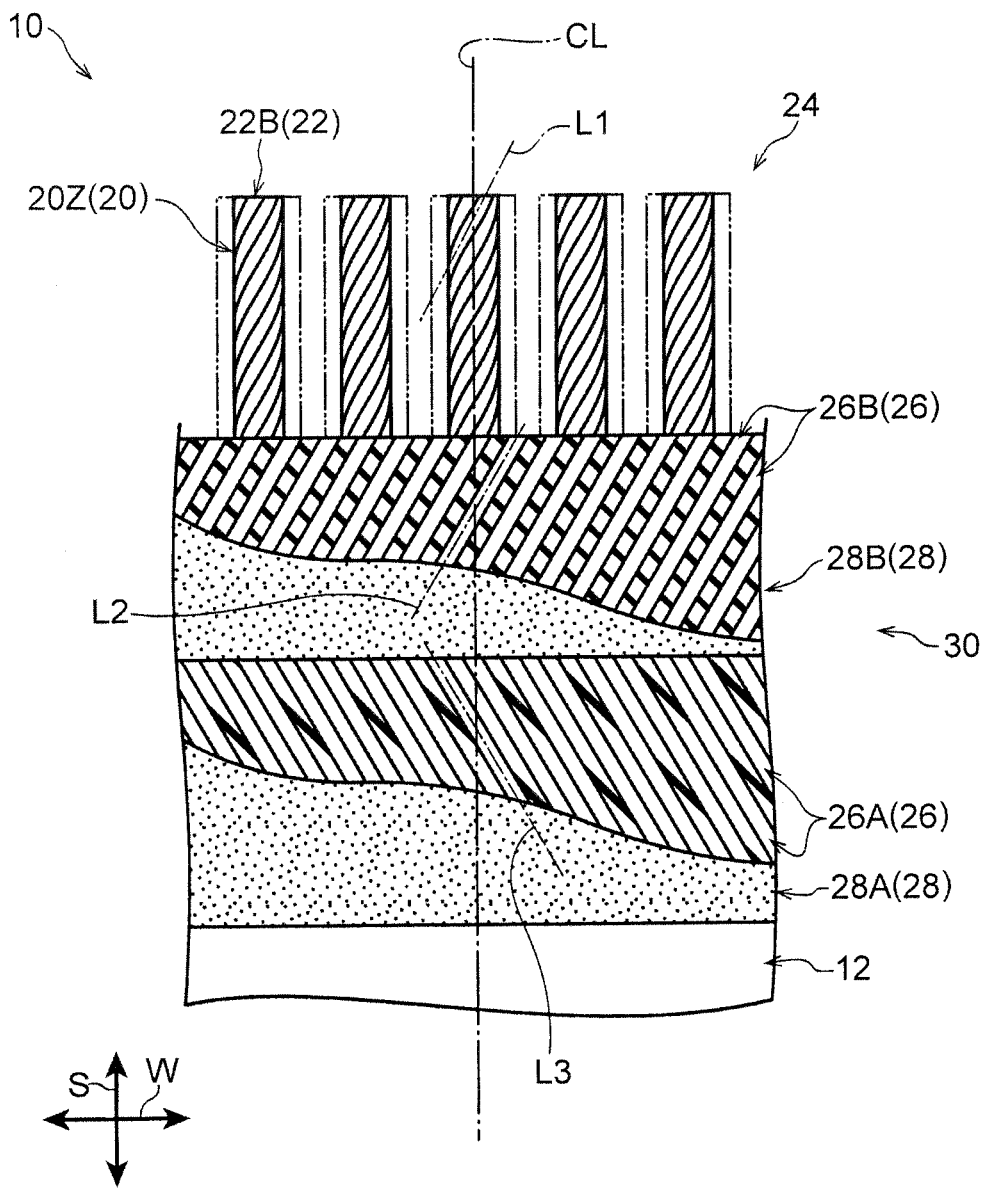
FIG. 5 is a partially cut away plan view of respective cord layers in a rubber crawler of the first exemplary embodiment, as viewed from the crawler circumferential outside.

Note that "Z-twisting" refers to twisting in which the extension direction (twisting direction) of the strands 22 (the sheath strands 22B) runs from top right to bottom left with respect to the axial center of the main cord 20 in plan view, as illustrated in FIG. 5. In FIG. 5, the main cord formed by Z-twisting the strands 22 is indicated by the reference numeral 20Z.

In the present exemplary embodiment, steel cord that exhibits excellent tensile strength is employed as the main cord 20, however the present invention is not limited thereto, and an organic fiber cord configured from organic fibers (for example nylon fibers, aromatic polyamide fibers or the like) may be employed as the main cord 20 provided that there is sufficient tensile strength.

As illustrated in FIG. 3, an endless belt shaped bias cord layer 30, configured by at least one endless belt shaped bias ply 28, is incorporated within the rubber belt 12 at the crawler circumferential outside of the main cord layer 24. The bias ply 28 is formed from plural bias cords 26 extending at an angle with respect to the crawler circumferential direction, disposed side-by-side around the crawler circumferential direction, and covered with rubber.

To elaborate more specifically on the bias cord layer 30, as illustrated in FIG. 5, the bias cord layer 30 of the present exemplary embodiment is configured by 2 bias plies 28. In the following, a crawler circumferential outermost bias ply is indicated by the reference numeral 28A, and a bias ply adjacent to the bias ply 28A is indicated by the reference numeral 28B.

As viewed from the crawler circumferential outside, the bias cords 26A of the bias ply 28A are angled with respect to the crawler circumferential direction toward the opposite side to the angled side of the sheath strands 22B.

More specifically, the bias cords 26A are angled with respect to the center line CL of the rubber crawler 10 that extends around the crawler circumferential direction in a straight line shape (in FIG. 5, angled from top left to bottom right (the angle direction indicated by the single-dotted intermittent line L3)). The sheath strands 22B of the Z-twisted main cord 20 are angled with respect to the center line CL (in FIG. 5, angled toward from top right to bottom left (the angle direction indicated by the single-dotted intermittent line L1)) toward the opposite side to the angled side of the bias cords 26A. Note that the angle of the sheath strands 22B with respect to the center line CL (the single-dotted intermittent line) is not particularly limited, however is preferably set within a range of, for example, around 10 to 25 degrees.

However, in the bias ply 28B, the bias cords 26B are angled with respect to the crawler circumferential direction in the opposite direction to the bias cords 26A, as viewed from the crawler circumferential outside. More specifically, the bias cords 26B are angled with respect to the center line CL (in FIG. 5, angled from top right to bottom left (the angle direction indicated by the single-dotted intermittent line L2)). Namely, the bias cords 26 of each respective bias ply 28 mutually overlap each other and are angled in opposite directions to each other with respect to the center line CL.

In the present exemplary embodiment, the angle of the bias cords 26A with respect to the center line CL is set at the same value as the angle of the bias cords 26B with respect to the center line CL. Note that the angle of the bias cords 26A with respect to the center line CL and the angle of the bias cords 26B with respect to the center line CL may be different from each other provided that respective shear deformation of the main cord layer 24 and the bias cord layer 30 (the bias plies 28A, 28B) can be canceled out, as described later.

The bias cord layer 30 is employed to protect the main cord layer 24 (in particular the main cord 20) when the rubber crawler 10 rides over objects protruding from the ground contacted during travel, and to suppress cracks arising at the circumferential outside of the rubber crawler 10 from developing as far as the main cord layer 24 (in particular the main cord 20). The tensile strength (pulling strength) of the bias cords 26 is accordingly set lower than the tensile strength of the main cord 20 from the perspective of flexibility with respect to bending of the rubber crawler 10.

In the present exemplary embodiment, steel cord with a smaller diameter than the main cord 20 is employed for the bias cords 26 from the perspective of flexibility with respect to bending of the rubber crawler 10; however the present invention is not limited to such a configuration, and an organic fiber cord configured from organic fibers (for example nylon fibers, aromatic polyamide fibers or the like) may be employed for the bias cords 26 provided that there is sufficient tensile strength.

The main cord layer 24 and the bias plies 28 (bias ply 28A, bias ply 28B) of the present exemplary embodiment are what are referred to as unidirectional fiber reinforcement materials (composite materials in which reinforcing fibers are arranged in a single direction), and so shear deformation occurs in response to tension in the crawler circumferential direction, as described later.

Next, explanation follows regarding operation and advantageous effects of the present exemplary embodiment.

In a portion of the rubber crawler 10 that is trained around the wheels (referred to below as the "trained portion C"), the main cord layer 24 bends and is pulled along the outer circumference of the wheels (the drive wheel 100 and the idler wheel 102 in FIG. 1) (is pulled in the crawler circumferential direction). When this occurs, with reference to the axial center X (see FIG. 4), tension occurs in the main cord 20 at a portion 20A further to the crawler circumferential outside than the axial center X, and compression occurs in the main cord 20 at a portion 20B further to the crawler circumferential inside than the axial center X.

Viewed from the crawler circumferential outside, the sheath strands 22B configuring the main cord 20 are angled (angled from top right to bottom left in FIG. 5) along the twisting direction (Z twisting in the present exemplary embodiment) with respect to the center line CL, as illustrated in FIG. 5. The crawler circumferential outside of the main cord layer 24 accordingly functions as a cord layer in which the cord is angled with respect to the crawler circumferential direction in one direction, and the crawler circumferential inside of the main cord layer 24 functions as a cord layer in which the cord is angled with respect to the crawler circumferential direction in the opposite direction to the crawler circumferential outside of the main cord layer 24.

A pseudo-cord layer formed by the crawler circumferential inside of the main cord layer 24 configures a compressed side during the bending mentioned above, thereby undergoing similar shear deformation to a pseudo-cord layer formed by the crawler circumferential outside of the main cord layer 24.

In the trained portion C of the rubber crawler 10, the main cord layer 24 configures a bend neutral plane (neutral axis), such that crawler circumferential direction tension arises in the bias cord layer 30. Out of the bias plies 28 configuring the bias cord layer 30, the crawler circumferential outermost bias ply 28A is the furthest away from the bend neutral plane, and is thereby subject to the greatest tensile force and undergoes the greatest shear deformation.

Note that, as viewed from the crawler circumferential outside, the bias cords 26A of the crawler circumferential outermost bias ply 28A are angled toward the opposite side to the angled side of the sheath strands 22B of the main cord 20 with respect to the center line CL, and so the shear deformation of the main cord layer 24 and the shear deformation of the bias cord layer 30 cancel each other out, thereby suppressing deformation of the rubber crawler 10. Lateral slippage of the rubber crawler 10 that circulates between the wheels on which it is trained can accordingly be suppressed.

Due to the above, the rubber crawler 10 is capable of suppressing deformation (shear deformation) of the respective cord layers embedded therein, and is capable of suppressing lateral slippage during travel.

In the rubber crawler 10, the respective bias cords 26 of the mutually overlapping bias plies 28 are angled in mutually opposite directions with respect to the center line CL, such that each of the mutually overlapping bias plies 28 substantially cancels out shear deformation of the other, thereby enabling deformation of the rubber crawler 10 to be effectively suppressed. To elaborate more specifically on the this point, the shear deformation amount of each cord layer is proportional to the distance from the bend neutral plane, and so the shear deformation due to the angle with respect to the center line CL of the bias cords 26A of the crawler circumferential outermost bias ply 28A is larger than the shear deformation due to the angle with respect to the center line CL of the sheath strands 22B of the main cord layer 24. Note that the bias ply 28B is formed overlapping the bias ply 28A at the crawler circumferential inside of the bias ply 28A, and so the shear deformation of the bias ply 28A, the shear deformation of the bias ply 28B, and the shear deformation of the main cord layer 24 respectively cancel each other out, enabling deformation of the rubber crawler 10 to be effectively suppressed.

Figure 6:
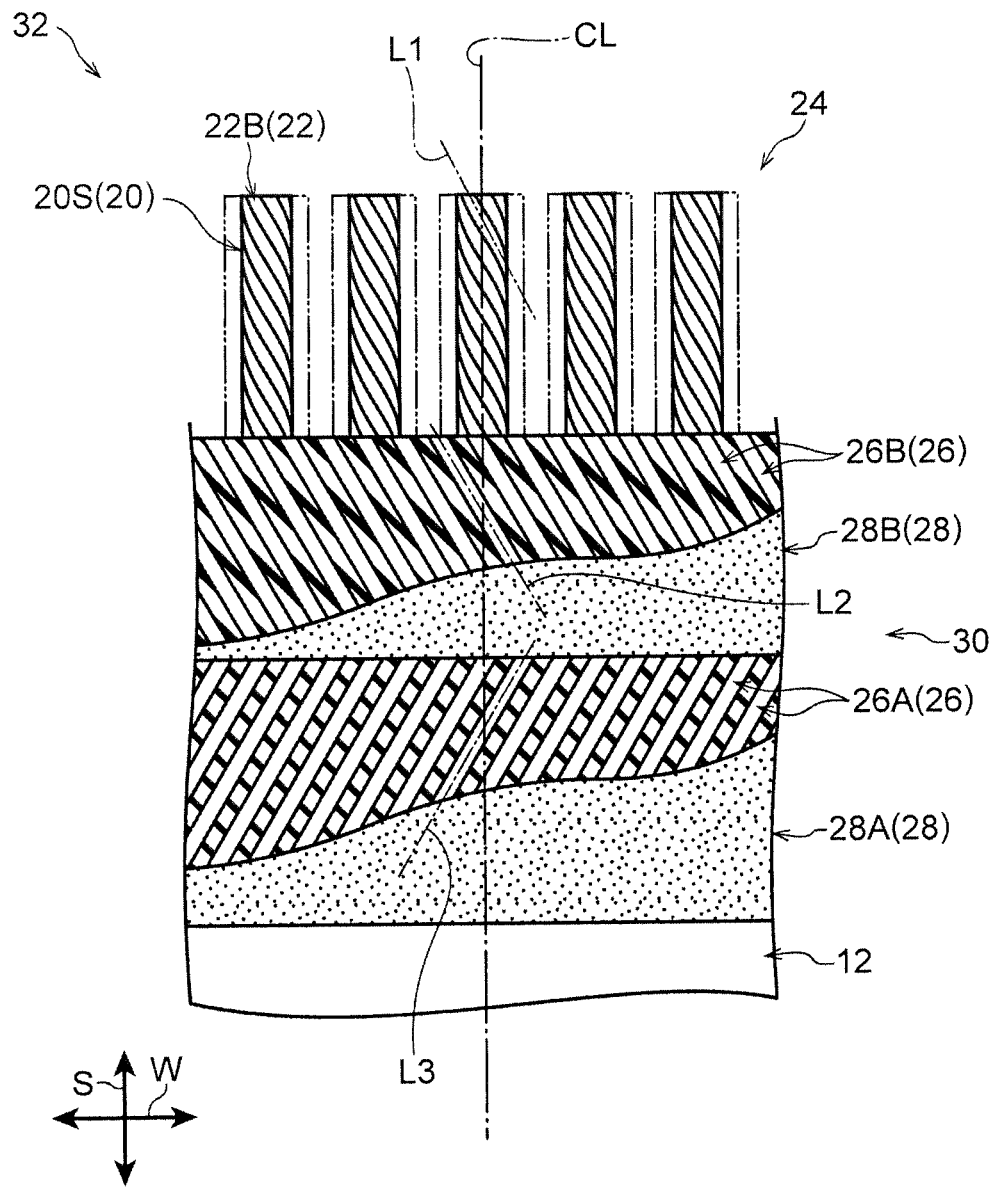
FIG. 6 is a partially cut away plan view of respective cord layers in a rubber crawler of a second exemplary embodiment, as viewed from the crawler circumferential outside.

In the rubber crawler 10 of the first exemplary embodiment, the strands 22 are Z-twisted to configure the main cord 20, and the main cord layer 24 is formed from the main cord 20; however the present invention is not limited to such a configuration. For example, as in a rubber crawler 32 of a second exemplary embodiment illustrated in FIG. 6, the strands 22 may be S-twisted to configure the main cord 20, and the main cord layer 24 formed from the main cord 20. Note that in FIG. 6, the main cord formed by S-twisting the sheath strands 22B is indicated by the reference numeral 20S. In cases in which the main cord 20 is configured with an S-twisted structure, as viewed from the crawler circumferential outside the angle direction with respect to the center line CL of the strands 22 (the sheath strands 22B) (in FIG. 6, from top left to bottom right (the angle direction indicated by the single-dotted intermittent line L1)) is the opposite direction to that in a Z-twisted structure, and so the angle directions with respect to the center line CL of the respective bias cords 26A, 26B of the bias plies 28A, 28B (single-dotted intermittent lines L3, L2) are reversed (see FIG. 6). Note that "S-twisting" refers to twisting in the opposite direction to Z-twisting, and as illustrated in FIG. 6, is twisting in which the extension direction of the strands 22 (sheath strands 22B) is angled from top left to bottom right with respect to the axial center of the main cord 20 in plan view of the main cord 20.

Figure 7:
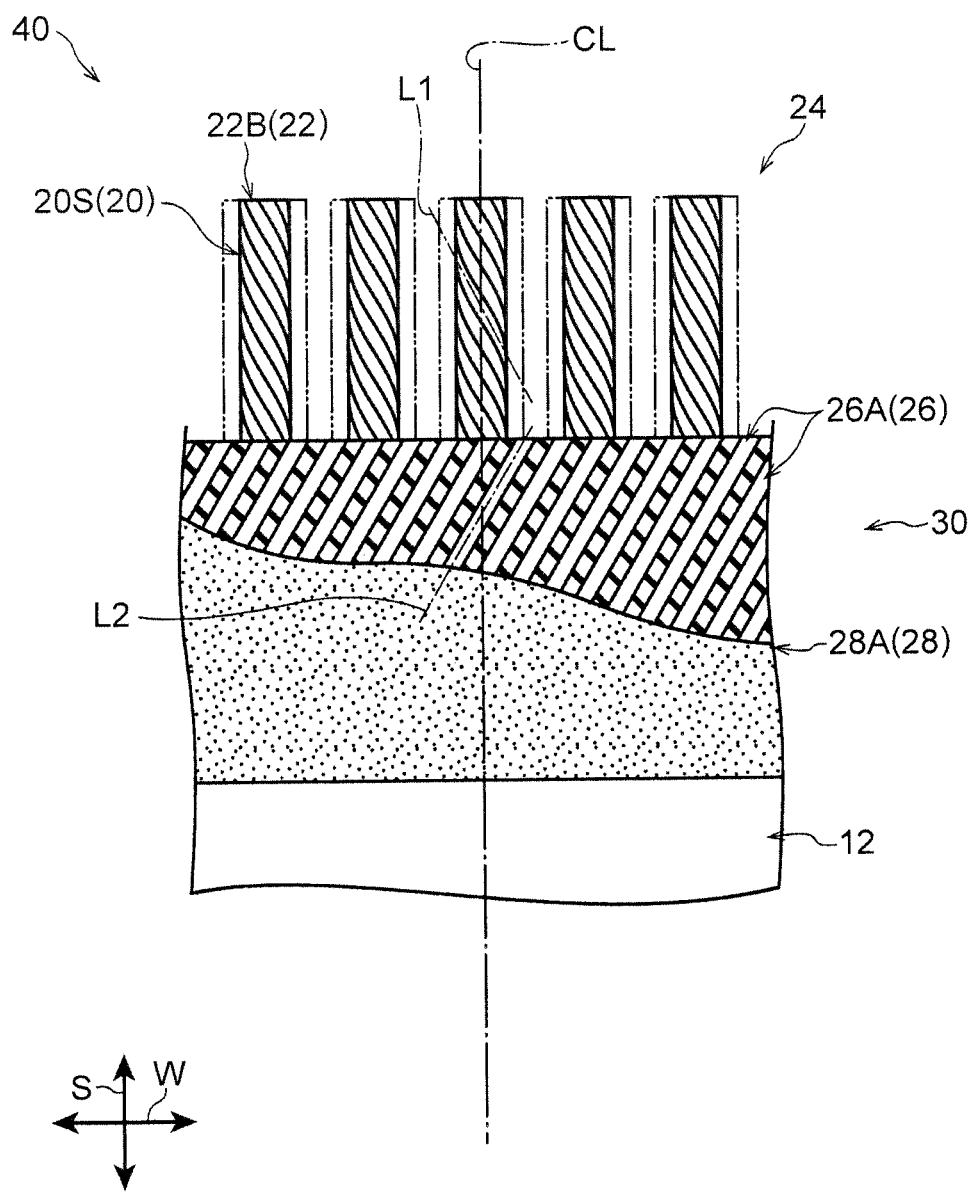
FIG. 7 is a partially cut away plan view of respective cord layers in a rubber crawler of a third exemplary embodiment, as viewed from the crawler circumferential outside.
Figure 8:
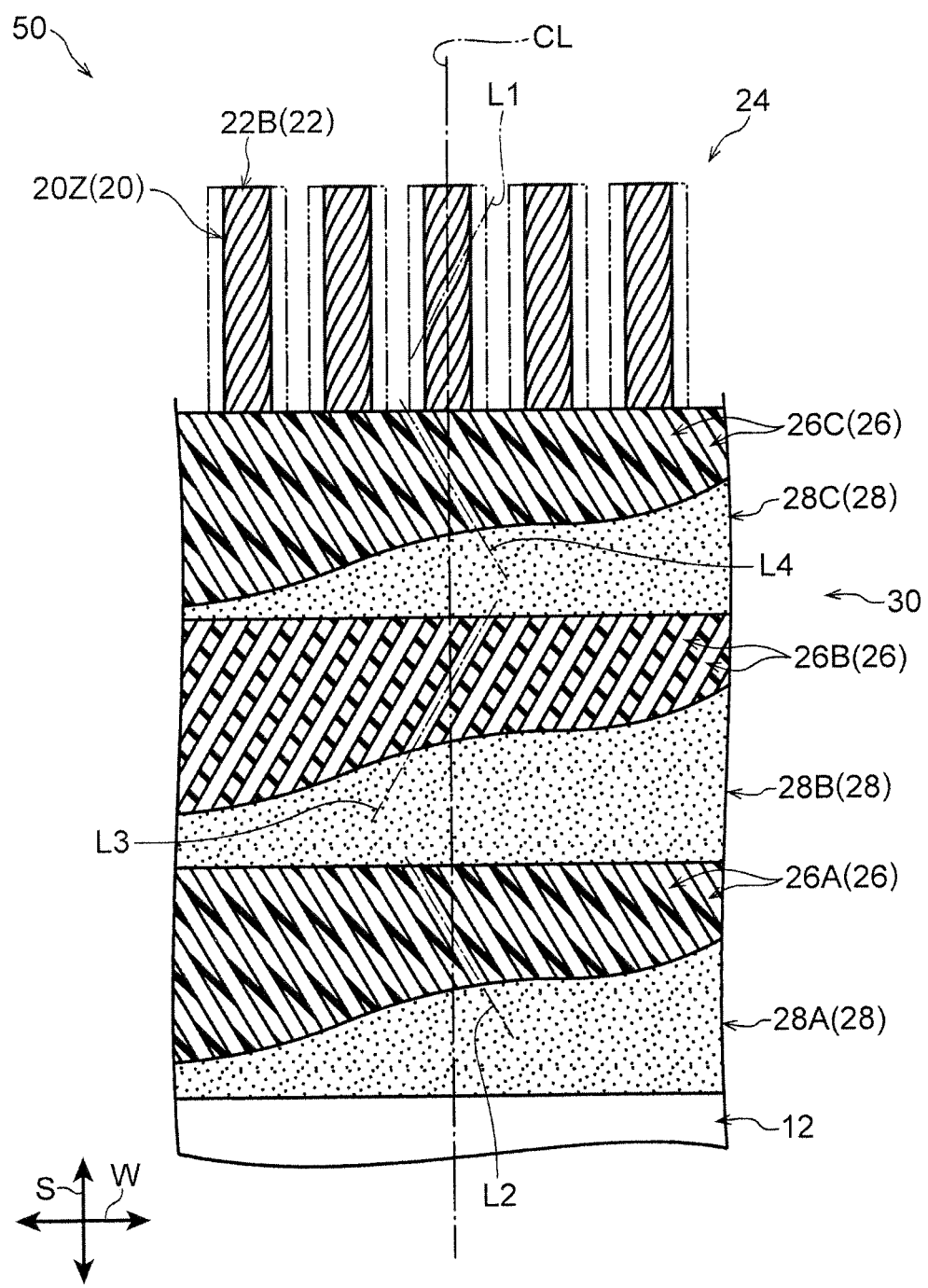
FIG. 8 is a partially cut away plan view of respective cord layers in a rubber crawler of a fourth exemplary embodiment, as viewed from the crawler circumferential outside.

In the rubber crawler 10 of the first exemplary embodiment, as illustrated in FIG. 5, the bias cord layer 30 is configured from the 2 bias plies 28 (28A, 28B); however the present invention is not limited to such a configuration. The bias cord layer 30 may be configured from 1, or 3 or more, bias plies 28, as long as, viewed from the crawler circumferential outside, the bias cords 26A of the crawler circumferential outermost bias ply 28A are angled toward the opposite side to the angled side of the sheath strands 22B with respect to the center line CL. FIG. 7 illustrates a rubber crawler 40 of a third exemplary embodiment, in which a single bias ply 28 (bias ply 28A) configures the bias cord layer 30. Note that in the rubber crawler 40, the main cord 20 has an S-twisted structure. FIG. 8 illustrates a rubber crawler 50 of a fourth exemplary embodiment, in which 3 bias plies 28 (bias plies 28A, 28B, 28C) configure the bias cord layer 30. Note that in FIG. 8, the reference numeral 26C indicates the bias cord of the crawler circumferential innermost bias ply 28C. In the rubber crawler 50, the main cord 20 has a Z-twisted structure.

Figure 9:
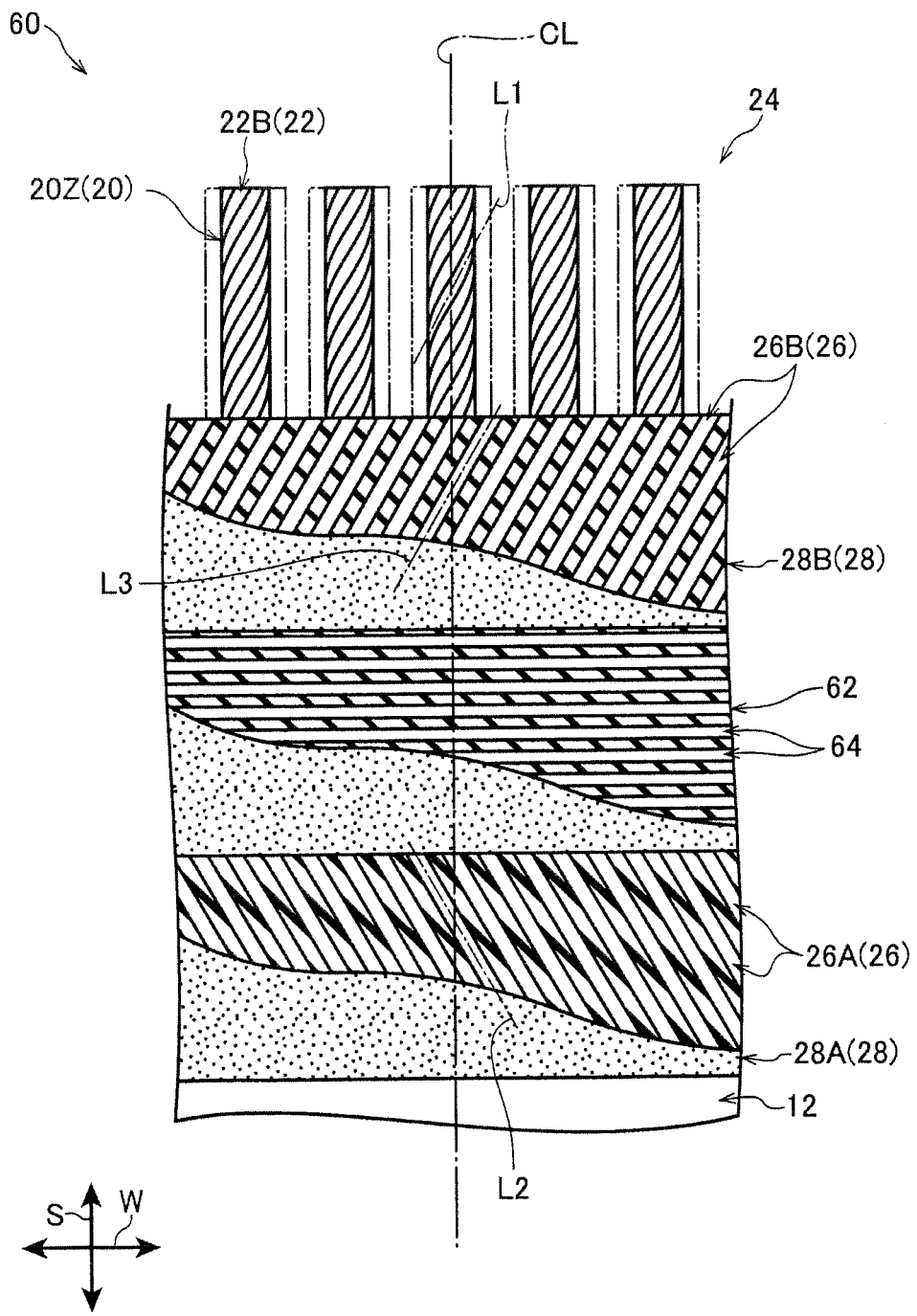
FIG. 9 is a partially cut away plan view of respective cord layers in a rubber crawler of a fifth exemplary embodiment, as viewed from the crawler circumferential outside.

Next, explanation follows regarding a rubber crawler of a fifth exemplary embodiment of the present invention, with reference to FIG. 9. Configurations similar to the first exemplary embodiment are allocated the same reference numerals, and explanation thereof is omitted.

As illustrated in FIG. 9, a rubber crawler 60 of the present exemplary embodiment is additionally provided with a zero degrees cord layer 62, and is otherwise of the same configuration as the rubber crawler 10 of the first exemplary embodiment. Explanation accordingly follows regarding configuration of the zero degrees cord layer 62.

As illustrated in FIG. 9, in the rubber crawler 60 the endless belt shaped zero degrees cord layer 62 is interposed between the bias ply 28A and the bias ply 28B configuring the bias cord layer 30. The zero degrees cord layer 62 is formed by disposing zero degrees cords 64 that extend in a straight line shape in the crawler width direction side-by-side around the crawler circumferential direction, and covering the zero degrees cords 64 with rubber. Note that the zero degrees cord 64 of the present exemplary embodiment extends in an orthogonal direction to the center line CL of the rubber crawler 60, as illustrated in plan view in FIG. 9.

In the present exemplary embodiment, steel cord with a smaller diameter than the main cord 20 is employed as the zero degrees cord 64, however the present invention is not limited thereto, and an organic fiber cord configured from organic fibers (for example nylon fibers, aromatic polyamide fibers or the like) may be employed for the zero degrees cord 64 provided that there is sufficient tensile strength.

Explanation follows regarding operation and advantageous effects of the rubber crawler 60 of the fifth exemplary embodiment.

Note that of the operation and advantageous effects of the present exemplary embodiment, explanation regarding operation and advantageous effects similar to those of the first exemplary embodiment is omitted as appropriate.

In the rubber crawler 60, the zero degrees cord layer 62 is provided between the bias ply 28A and the bias ply 28B, thereby enhancing the advantageous effect of protecting the main cord layer 24 (in particular the main cord 20).

The zero degrees cord layer 62 is configured from the zero degrees cords 64 that extend in a straight line shape in the crawler width direction, making deformation in the crawler width direction more difficult. When the bias ply 28A and the bias ply 28B are pulled in the crawler circumferential direction and deform, they undergo deformation to become narrower in width in the crawler width direction (namely, Poisson contraction).

Such deformation (Poisson contraction) of the bias ply 28A and the bias ply 28B to become narrower in width in the crawler width direction when pulled in the crawler circumferential direction can be suppressed by interposing the zero degrees cord layer 62 between the bias ply 28A and the bias ply 28B. Shear deformation accompanying respective tensile deformation of the bias ply 28A and the bias ply 28B can be effectively suppressed as a result.

Crack formation between each of the cord layers due to large degrees of shear deformation occurring in each cord layer can accordingly be suppressed, and the durability of the rubber crawler 60 can be increased.

In the first to the fifth exemplary embodiments, the main cord layer 24 is configured by winding a single rubber covered main cord 20 in a spiral shape, however the present invention is not limited to such a configuration, and a belt shaped main cord ply may be formed by embedding plural main cords 20 in a rubber material side-by-side in the crawler width direction, and an endless belt shaped main cord layer 24 may be configured by superimposing and joining together both ends of the main cord ply. Note that in such a configuration, the main cord 20 may be disposed in a straight line shape along the center line CL.

In the first to the fifth exemplary embodiments, the rubber crawler has a structure in which there is no internal metal core disposed at portions driven by frictional force between the rubber belt 12 and the wheels (the drive wheel 100); however the present invention is not limited to such a configuration, and a metal cores may be incorporated inside the rubber crawler.

In the first to the fifth exemplary embodiments, the rubber crawler has a structure driven by frictional force between the rubber belt 12 and the wheels (the drive wheel 100); however the present invention is not limited to such a configuration, and the rubber crawler may have a structure in which plural pins spanning around the outer circumferential edge portions of the wheel portions 100A of the drive wheel 100 push against the rubber projections 14 to transmit drive force from the drive wheel 100 to the rubber belt 12 (rubber crawler).

The first to the fifth exemplary embodiments employ the rubber belt 12 formed from rubber material in an endless belt shape as an example of an endless rubber body; however the present invention is not limited to such a configuration, and a rubber-elastic body belt configured from a material with rubber-like elasticity formed into an endless shape, such as an elastomer belt configured by forming an elastomer that is a resin material with rubber-like elasticity into an endless shape, may be employed as an example of the endless rubber body.

Exemplary embodiments have been described in the above explanation of the present invention, however these exemplary embodiments are merely examples, and various modifications may be implemented within a range not departing from the spirit of the present invention. It goes without saying that the scope of rights of the present invention is not limited by these exemplary embodiments.

Test Example

In order to verify the advantageous effects of the present invention, an Example rubber crawler of the present invention, and a Comparative Example rubber crawler not included in the present invention were tested as follows. The sample rubber crawlers employed during testing were the same size as each other.

Sample Rubber Crawlers

Example: a rubber crawler with the structure of the rubber crawler of the first exemplary embodiment.

Comparative Example: a rubber crawler that is the rubber crawler of the first exemplary embodiment, with a structure in which the bias cords 26A of the crawler circumferential outermost bias ply 28A are angled toward the same side as the angled side of the sheath strands 22B of the main cord 20 with respect to the center line CL as viewed from the crawler circumferential outside.

Test Method

Figure 10:
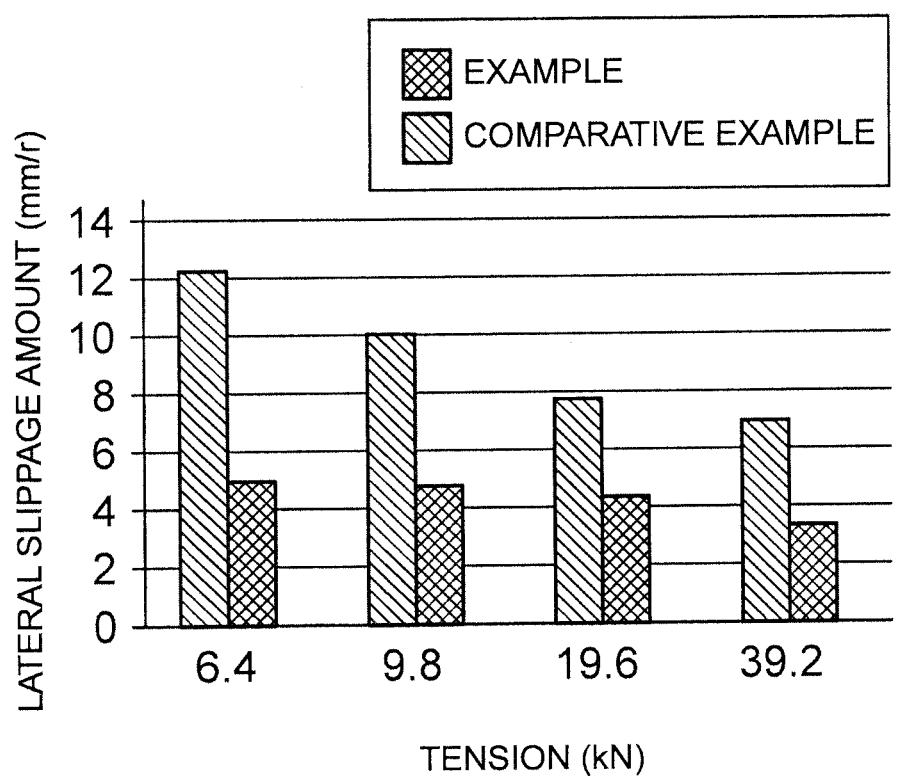
FIG. 10 is a graph illustrating a relationship between tension imparted to a rubber crawler, and lateral slippage amount of the rubber crawler over one lap between a drive wheel and a following wheel.

The sample rubber crawlers were trained around a drive wheel and a following wheel of a test device and circulated one lap between the drive wheel and the following wheel in a state applied with a specific tensile force (tension), and the lateral slippage amount (movement amount) of the rubber crawlers was measured. The test results are illustrated in FIG. 10. Note that for the lateral slippage amount of the rubber crawlers, the lower the value, the better the result.

As illustrated in FIG. 10, when the sample rubber crawlers were circulated one lap while applying different tensions to the sample rubber crawlers, the values for the Example were lower than the values for the Comparative Example for lateral slippage amount. Namely, the rubber crawler of the Example suppresses deformation of each internally provided cord layer, and suppresses lateral slippage during travel.

The invention claimed is:

1. A rubber crawler comprising:
   an endless rubber body that is trained around a plurality of wheels;
   a main cord layer that is incorporated within the endless rubber body and includes a main cord configured from a plurality of twisted strands covered with rubber, the main cord extending along a circumferential direction of the endless rubber body; and
   a bias cord layer that is incorporated within the endless rubber body further to a circumferential outside of the endless rubber body than the main cord layer and configured from at least one bias ply that is formed from a plurality of bias cords extending at an angle with respect to the circumferential direction, the at least one bias ply and the main cord layer disposed side-by-side along the circumferential direction and covered in rubber such that bias cords of the bias ply at a circumferential outermost side of the endless rubber body are, as viewed from the circumferential outside, angled toward an opposite side, with respect to the circumferential direction, from the angled side of the strands,
   wherein
   the endless rubber body comprises a first side on a left side in a width direction of the endless rubber body relative to a center line of the endless rubber body in the circumferential direction, and a second side on a right side in the width direction relative to the center line, and
   in both the first side and the second side, a direction of the plurality of twisted strands of the main cord, and a direction of the bias cords of the bias ply at the circumferential outermost side of the endless rubber body are, as viewed from the circumferential outside, angled toward the opposite side, with respect to the circumferential direction.

2. The rubber crawler of claim 1, wherein respective bias cords of mutually overlapping bias plies are angled in mutually opposite directions from each other with respect to the circumferential direction.

* * * * *